(12) United States Patent
Harris et al.

(10) Patent No.: US 11,250,794 B2
(45) Date of Patent: Feb. 15, 2022

(54) METHODS FOR DRIVING ELECTROPHORETIC DISPLAYS USING DIELECTROPHORETIC FORCES

(71) Applicants: George G. Harris, Woburn, MA (US); Richard J. Paolini, Jr., Framingham, MA (US); Thomas H. Whitesides, Somerville, MA (US); Michael D. McCreary, Acton, MA (US); Charles Howie Honeyman, Roslindale, MA (US)

(72) Inventors: George G. Harris, Woburn, MA (US); Richard J. Paolini, Jr., Framingham, MA (US); Thomas H. Whitesides, Somerville, MA (US); Michael D. McCreary, Acton, MA (US); Charles Howie Honeyman, Roslindale, MA (US)

(73) Assignee: E Ink Corporation, Billerica, MA (US)

( * ) Notice: Subject to any disclaimer, the term of this patent is extended or adjusted under 35 U.S.C. 154(b) by 217 days.

(21) Appl. No.: 15/204,096

(22) Filed: Jul. 7, 2016

(65) Prior Publication Data

US 2016/0314750 A1    Oct. 27, 2016

Related U.S. Application Data

(60) Division of application No. 11/949,316, filed on Dec. 3, 2007, now abandoned, which is a
(Continued)

(51) Int. Cl.
*G02B 26/00*   (2006.01)
*G02F 1/03*    (2006.01)
(Continued)

(52) U.S. Cl.
CPC ........... *G09G 3/344* (2013.01); *G02F 1/1345* (2013.01); *G02F 1/13306* (2013.01);
(Continued)

(58) Field of Classification Search
CPC .... G02F 1/167; G02F 2001/1678; G02F 1/03; G02F 1/133; G02F 1/061; G02B 26/26; G02B 26/00; G02B 26/08
(Continued)

(56) References Cited

U.S. PATENT DOCUMENTS

| | | |
|---|---|---|
| 2,932,629 A | 4/1960 | Wiley |
| 2,934,530 A | 4/1960 | Ballast et al. |

(Continued)

FOREIGN PATENT DOCUMENTS

| | | |
|---|---|---|
| DE | 2523763 | 12/1976 |
| EP | 281204 | 9/1988 |

(Continued)

OTHER PUBLICATIONS

Ackerman, "E Ink of Cambridge gets start-up funding", Boston Globe, Dec. 24, 1997, page D4 Dec. 24, 1997.
(Continued)

*Primary Examiner* — Dawayne Pinkney
(74) *Attorney, Agent, or Firm* — Zhen Bao

(57) ABSTRACT

A dielectrophoretic display is shifted from a low frequency closed state to a high frequency open state via at least one, and preferably several, intermediate frequency states; the use of such multiple frequency steps reduces flicker during the transition. A second type of dielectrophoretic display has a light-transmissive electrode through which the dielectrophoretic medium can be viewed and a conductor connected to the light-transmissive electrode at several points to reduce voltage variations within the light-transmissive electrode.

8 Claims, 5 Drawing Sheets

Related U.S. Application Data continuation-in-part of application No. 11/460,358, filed on Jul. 27, 2006, now Pat. No. 7,304,787, and a continuation-in-part of application No. 11/162,188, filed on Aug. 31, 2005, now Pat. No. 7,999,787, said application No. 11/460,358 is a division of application No. 11/161,179, filed on Jul. 26, 2005, now Pat. No. 7,116,466.

(60) Provisional application No. 60/867,876, filed on Feb. 2, 2007, provisional application No. 60/605,761, filed on Aug. 31, 2004, provisional application No. 60/591,416, filed on Jul. 27, 2004.

(51) Int. Cl.
    G02F 1/133      (2006.01)
    G09G 3/34       (2006.01)
    G03G 13/00      (2006.01)
    G02F 1/1345     (2006.01)
    G02F 1/167      (2019.01)
    G09G 3/20       (2006.01)
    G02F 1/1676     (2019.01)

(52) U.S. Cl.
    CPC ........... *G02F 1/167* (2013.01); *G09G 3/2007* (2013.01); *G02F 1/1676* (2019.01); *G02F 2202/42* (2013.01); *G09G 2310/06* (2013.01); *G09G 2320/0223* (2013.01); *G09G 2320/0247* (2013.01)

(58) Field of Classification Search
    USPC ........ 359/296, 253–254, 245, 290–291, 298; 349/33; 345/49, 105, 107; 430/31, 32
    See application file for complete search history.

(56) References Cited

U.S. PATENT DOCUMENTS

| | | |
|---|---|---|
| 3,036,388 A | 5/1962 | Tate |
| 3,385,927 A | 5/1968 | Hamann |
| 3,406,363 A | 10/1968 | Tate |
| 3,560,956 A | 2/1971 | Sinnott |
| 3,617,374 A | 11/1971 | Hodson et al. |
| 3,668,106 A | 6/1972 | Ota |
| 3,689,400 A | 9/1972 | Ota et al. |
| 3,697,150 A | 10/1972 | Wysocki |
| 3,756,693 A | 9/1973 | Ota |
| 3,765,011 A | 10/1973 | Sawyer et al. |
| 3,767,392 A | 10/1973 | Ota |
| 3,792,308 A | 2/1974 | Ota |
| 3,806,893 A | 4/1974 | Ohnishi et al. |
| 3,850,627 A | 11/1974 | Wells et al. |
| 3,870,517 A | 3/1975 | Ota et al. |
| 3,892,568 A | 7/1975 | Ota |
| 3,960,439 A | 6/1976 | Becker et al. |
| 3,972,040 A | 7/1976 | Hilsum et al. |
| 3,980,476 A | 9/1976 | Wysocki |
| 4,041,481 A | 8/1977 | Sato |
| 4,045,327 A | 8/1977 | Noma et al. |
| 4,071,430 A | 1/1978 | Liebert |
| 4,088,395 A | 5/1978 | Gigila |
| 4,123,346 A | 10/1978 | Ploix |
| 4,126,854 A | 11/1978 | Sheridon |
| 4,143,103 A | 3/1979 | Sheridon |
| 4,203,106 A | 5/1980 | Philips |
| 4,218,302 A | 8/1980 | Philips |
| 4,231,641 A | 11/1980 | Randin |
| 4,261,653 A | 4/1981 | Goodrich |
| 4,305,807 A | 12/1981 | Somlyody |
| 4,345,249 A | 8/1982 | Togashi |
| 4,368,952 A | 1/1983 | Murata et al. |
| 4,390,403 A | 6/1983 | Batchelder |
| 4,402,062 A | 8/1983 | Batchelder |
| 4,411,495 A | 10/1983 | Beni et al. |
| 4,418,346 A | 11/1983 | Batchelder |
| 4,430,648 A | 2/1984 | Togashi et al. |
| 4,435,047 A | 3/1984 | Fergason |
| 4,438,160 A | 3/1984 | Ishikawa et al. |
| 4,450,440 A | 5/1984 | White |
| 4,509,828 A | 4/1985 | Clerc et al. |
| 4,522,472 A | 6/1985 | Liebert et al. |
| 4,605,284 A | 8/1986 | Fergason |
| 4,616,903 A | 10/1986 | Fergason |
| 4,643,528 A | 2/1987 | Bell, Jr. |
| 4,648,956 A | 3/1987 | Marshall et al. |
| 4,703,573 A | 11/1987 | Montgomery et al. |
| 4,707,080 A | 11/1987 | Fergason |
| 4,741,604 A | 5/1988 | Kornfeld |
| 4,746,917 A | 5/1988 | Di Santo et al. |
| 4,776,675 A | 10/1988 | Takaochi et al. |
| 4,833,060 A | 5/1989 | Nair et al. |
| 4,833,464 A | 5/1989 | Di Santo et al. |
| 4,835,084 A | 5/1989 | Nair et al. |
| 4,870,398 A | 9/1989 | Bos |
| 4,919,521 A | 4/1990 | Tada et al. |
| 4,947,157 A | 8/1990 | Di Santo et al. |
| 4,947,159 A | 8/1990 | Di Santo et al. |
| 4,948,232 A | 8/1990 | Lange |
| 4,965,131 A | 10/1990 | Nair et al. |
| 4,994,312 A | 2/1991 | Maier et al. |
| 5,055,371 A | 10/1991 | Lee et al. |
| 5,066,946 A | 11/1991 | Disanto et al. |
| 5,105,185 A | 4/1992 | Nakanowatari et al. |
| 5,109,354 A | 4/1992 | Yamashita et al. |
| 5,138,472 A | 8/1992 | Jones et al. |
| 5,181,016 A | 1/1993 | Lee |
| 5,187,609 A | 2/1993 | DiSanto et al. |
| 5,216,530 A | 6/1993 | Pearlman et al. |
| 5,220,316 A | 6/1993 | Kazan |
| 5,223,115 A | 6/1993 | DiSanto et al. |
| 5,223,823 A | 6/1993 | Disanto et al. |
| 5,247,290 A | 9/1993 | Di Santo et al. |
| 5,250,938 A | 10/1993 | DiSanto et al. |
| 5,254,981 A | 10/1993 | Disanto et al. |
| 5,262,098 A | 11/1993 | Crowley et al. |
| 5,266,937 A | 11/1993 | DiSanto et al. |
| 5,270,843 A | 12/1993 | Wang |
| 5,276,438 A | 1/1994 | DiSanto et al. |
| 5,279,694 A | 1/1994 | DiSanto et al. |
| 5,280,280 A | 1/1994 | Hotto |
| 5,293,528 A | 3/1994 | DiSanto et al. |
| 5,302,235 A | 4/1994 | DiSanto et al. |
| 5,315,312 A | 5/1994 | DiSanto et al. |
| 5,316,341 A | 5/1994 | Schwartz |
| 5,344,594 A | 9/1994 | Sheridon |
| 5,345,251 A | 9/1994 | DiSanto et al. |
| 5,354,799 A | 10/1994 | Bennett et al. |
| 5,357,355 A | 10/1994 | Arai |
| 5,377,258 A | 12/1994 | Bro |
| 5,383,008 A | 1/1995 | Sheridon |
| 5,389,945 A | 2/1995 | Sheridon |
| 5,390,026 A | 2/1995 | Lim |
| 5,398,131 A | 3/1995 | Hall |
| 5,402,145 A | 3/1995 | Disanto et al. |
| 5,407,231 A | 4/1995 | Schwartz |
| 5,411,398 A | 5/1995 | Nakanishi et al. |
| 5,412,398 A | 5/1995 | DiSanto et al. |
| 5,463,491 A | 10/1995 | Check, III |
| 5,463,492 A | 10/1995 | Check, III |
| 5,467,107 A | 11/1995 | DiSanto et al. |
| 5,467,217 A | 11/1995 | Check, III et al. |
| 5,484,292 A | 1/1996 | McTaggart |
| 5,485,176 A | 1/1996 | Ohara et al. |
| 5,499,038 A | 3/1996 | DiSanto et al. |
| 5,508,068 A | 4/1996 | Nakano |
| 5,508,720 A | 4/1996 | DiSanto et al. |
| 5,512,162 A | 4/1996 | Sachs et al. |
| 5,530,567 A | 6/1996 | Takei |
| 5,534,888 A | 7/1996 | Lebby et al. |
| 5,538,430 A | 7/1996 | Smith |
| 5,565,885 A | 10/1996 | Tamanoi |
| 5,573,711 A | 11/1996 | Hou et al. |

(56) References Cited

U.S. PATENT DOCUMENTS

| | | |
|---|---|---|
| 5,576,867 A | 11/1996 | Baur et al. |
| 5,580,692 A | 12/1996 | Lofftus et al. |
| 5,582,700 A | 12/1996 | Bryning |
| 5,594,562 A | 1/1997 | Sato et al. |
| 5,604,027 A | 2/1997 | Sheridon |
| 5,627,561 A | 5/1997 | Laspina et al. |
| 5,650,872 A | 7/1997 | Saxe et al. |
| 5,654,732 A | 8/1997 | Katakura |
| 5,659,330 A | 8/1997 | Sheridon |
| 5,684,501 A | 11/1997 | Knapp et al. |
| 5,689,282 A | 11/1997 | Wolfs et al. |
| 5,699,074 A | 12/1997 | Sutherland et al. |
| 5,700,608 A | 12/1997 | Eshelman et al. |
| 5,708,525 A | 1/1998 | Sheridon |
| 5,717,283 A | 2/1998 | Biegelsen et al. |
| 5,717,514 A | 2/1998 | Sheridon |
| 5,717,515 A | 2/1998 | Sheridon |
| 5,731,792 A | 3/1998 | Sheridon |
| 5,737,115 A | 4/1998 | Mackinlay et al. |
| 5,739,801 A | 4/1998 | Sheridon |
| 5,745,094 A | 4/1998 | Gordon, II et al. |
| 5,751,266 A | 5/1998 | Crossland et al. |
| 5,760,761 A | 6/1998 | Sheridon |
| 5,777,782 A | 7/1998 | Sheridon |
| 5,798,315 A | 8/1998 | Etoh et al. |
| 5,808,783 A | 9/1998 | Crowley |
| 5,852,427 A | 12/1998 | Buzak |
| 5,866,284 A | 2/1999 | Vincent |
| 5,872,552 A | 2/1999 | Gordon, II et al. |
| 5,892,504 A | 4/1999 | Knapp |
| 5,896,117 A | 4/1999 | Moon |
| 5,930,026 A | 7/1999 | Jacobson et al. |
| 5,933,203 A | 8/1999 | Wu et al. |
| 5,961,804 A | 10/1999 | Jacobson |
| 5,963,456 A | 10/1999 | Klein et al. |
| 5,978,052 A | 11/1999 | Ilcisin et al. |
| 6,002,384 A | 12/1999 | Tamai et al. |
| 6,017,584 A | 1/2000 | Albert et al. |
| 6,025,896 A | 2/2000 | Hattori et al. |
| 6,034,807 A | 3/2000 | Little et al. |
| 6,046,716 A | 4/2000 | McKnight |
| 6,052,106 A | 4/2000 | Maltese |
| 6,054,071 A | 4/2000 | Mikkelsen, Jr. |
| 6,055,091 A | 4/2000 | Sheridon et al. |
| 6,055,180 A | 4/2000 | Gudesen et al. |
| 6,057,814 A | 5/2000 | Kalt |
| 6,064,410 A | 5/2000 | Wen et al. |
| 6,067,185 A | 5/2000 | Albert et al. |
| 6,081,285 A | 6/2000 | Wen et al. |
| 6,097,531 A | 8/2000 | Sheridon |
| 6,113,810 A | 9/2000 | Hou et al. |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,154,190 A | 11/2000 | Yang et al. |
| 6,156,473 A | 12/2000 | Tyagi et al. |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,211,853 B1 | 4/2001 | Takeuchi et al. |
| 6,211,998 B1 | 4/2001 | Sheridon |
| 6,215,540 B1 | 4/2001 | Stephenson |
| 6,215,920 B1 | 4/2001 | Whitehead et al. |
| 6,225,971 B1 | 5/2001 | Gordon, II et al. |
| 6,232,950 B1 | 5/2001 | Albert et al. |
| 6,236,385 B1 | 5/2001 | Nomura et al. |
| 6,239,896 B1 | 5/2001 | Ikeda |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,281,643 B1 | 8/2001 | Ebihara |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,320,565 B1 | 11/2001 | Philips |
| 6,323,989 B1 | 11/2001 | Jacobson et al. |
| 6,327,072 B1 | 12/2001 | Comiskey et al. |
| 6,330,054 B1 | 12/2001 | Ikami |
| 6,348,908 B1 | 2/2002 | Richley et al. |
| 6,359,605 B1 | 3/2002 | Knapp et al. |
| 6,373,461 B1 | 4/2002 | Hasegawa et al. |
| 6,376,828 B1 | 4/2002 | Comiskey |
| 6,377,383 B1 | 4/2002 | Whitehead et al. |
| 6,377,387 B1 | 4/2002 | Duthaler et al. |
| 6,392,785 B1 | 5/2002 | Albert et al. |
| 6,392,786 B1 | 5/2002 | Albert |
| 6,407,763 B1 | 6/2002 | Yamaguchi et al. |
| 6,413,790 B1 | 7/2002 | Duthaler et al. |
| 6,421,033 B1 | 7/2002 | Williams et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,451,191 B1 * | 9/2002 | Bentsen ............ G01N 27/44782 204/600 |
| 6,459,418 B1 | 10/2002 | Comiskey et al. |
| 6,462,837 B1 | 10/2002 | Tone |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,498,674 B1 | 12/2002 | Sheridon |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,518,949 B2 | 2/2003 | Drzaic |
| 6,521,489 B2 | 2/2003 | Duthaler et al. |
| 6,531,997 B1 | 3/2003 | Gates et al. |
| 6,535,197 B1 | 3/2003 | Comiskey et al. |
| 6,538,801 B2 | 3/2003 | Jacobson |
| 6,545,291 B1 | 4/2003 | Amundson et al. |
| 6,556,262 B1 | 4/2003 | Stephenson et al. |
| 6,580,545 B2 | 6/2003 | Morrison et al. |
| 6,614,418 B2 | 9/2003 | Koyama et al. |
| 6,639,578 B1 | 10/2003 | Comiskey et al. |
| 6,650,462 B2 | 11/2003 | Katase |
| 6,652,075 B2 | 11/2003 | Jacobson |
| 6,657,612 B2 | 12/2003 | Machida et al. |
| 6,657,772 B2 | 12/2003 | Loxley |
| 6,664,944 B1 | 12/2003 | Albert et al. |
| D485,294 S | 1/2004 | Albert |
| 6,672,921 B1 | 1/2004 | Liang et al. |
| 6,680,725 B1 | 1/2004 | Jacobson |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,721,083 B2 | 4/2004 | Jacobson et al. |
| 6,724,519 B1 | 4/2004 | Morrison et al. |
| 6,727,881 B1 | 4/2004 | Albert et al. |
| 6,738,039 B2 | 5/2004 | Goden |
| 6,738,050 B2 | 5/2004 | Comiskey et al. |
| 6,750,473 B2 | 6/2004 | Amundson et al. |
| 6,753,844 B2 | 6/2004 | Machida et al. |
| 6,753,999 B2 | 6/2004 | Zehner et al. |
| 6,762,744 B2 | 7/2004 | Katase |
| 6,788,449 B2 | 9/2004 | Liang et al. |
| 6,795,226 B2 | 9/2004 | Agrawal et al. |
| 6,798,470 B2 | 9/2004 | Iwanaga et al. |
| 6,806,995 B2 | 10/2004 | Chung et al. |
| 6,816,147 B2 | 11/2004 | Albert |
| 6,819,471 B2 | 11/2004 | Amundson et al. |
| 6,822,782 B2 | 11/2004 | Honeyman et al. |
| 6,825,068 B2 | 11/2004 | Denis et al. |

(56) References Cited

U.S. PATENT DOCUMENTS

| | | |
|---|---|---|
| 6,825,829 B1 | 11/2004 | Albert et al. |
| 6,825,970 B2 | 11/2004 | Goenaga et al. |
| 6,831,769 B2 | 12/2004 | Holman et al. |
| 6,839,158 B2 | 1/2005 | Albert |
| 6,842,165 B2 | 1/2005 | Inoue |
| 6,842,167 B2 | 1/2005 | Albert et al. |
| 6,842,279 B2 | 1/2005 | Amundson |
| 6,842,657 B1 | 1/2005 | Drzaic et al. |
| 6,864,875 B2 | 3/2005 | Drzaic et al. |
| 6,865,010 B2 | 3/2005 | Duthaler et al. |
| 6,866,760 B2 | 3/2005 | Paolini Jr. et al. |
| 6,870,657 B1 | 3/2005 | Fitzmaurice et al. |
| 6,870,661 B2 | 3/2005 | Pullen et al. |
| 6,885,495 B2 | 4/2005 | Liang et al. |
| 6,900,851 B2 | 5/2005 | Morrison et al. |
| 6,919,003 B2 | 7/2005 | Canon |
| 6,922,276 B2 | 7/2005 | Zhang et al. |
| 6,950,200 B1 | 9/2005 | Yamada et al. |
| 6,950,220 B2 | 9/2005 | Abramson et al. |
| 6,956,557 B2 | 10/2005 | Machida et al. |
| 6,958,848 B2 | 10/2005 | Cao et al. |
| 6,965,366 B2 | 11/2005 | Ozawa |
| 6,967,640 B2 | 11/2005 | Albert et al. |
| 6,980,196 B1 | 12/2005 | Turner et al. |
| 6,982,178 B2 | 1/2006 | LeCain et al. |
| 6,987,603 B2 | 1/2006 | Paolini, Jr. et al. |
| 6,987,605 B2 | 1/2006 | Liang et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,012,735 B2 | 3/2006 | Honeyman et al. |
| 7,023,420 B2 | 4/2006 | Comiskey et al. |
| 7,030,412 B1 | 4/2006 | Drzaic et al. |
| 7,030,854 B2 | 4/2006 | Baucom et al. |
| 7,034,783 B2 | 4/2006 | Gates et al. |
| 7,038,655 B2 | 5/2006 | Herb et al. |
| 7,050,040 B2 | 5/2006 | Daniel et al. |
| 7,061,663 B2 | 6/2006 | Cao et al. |
| 7,071,913 B2 | 7/2006 | Albert et al. |
| 7,075,502 B1 | 7/2006 | Drzaic et al. |
| 7,075,703 B2 | 7/2006 | O'Neil et al. |
| 7,079,305 B2 | 7/2006 | Paolini, Jr. et al. |
| 7,084,848 B2 | 8/2006 | Senda et al. |
| 7,106,296 B1 | 9/2006 | Jacobson |
| 7,106,297 B2 | 9/2006 | Philips |
| 7,109,968 B2 | 9/2006 | Albert et al. |
| 7,110,163 B2 | 9/2006 | Webber et al. |
| 7,110,164 B2 | 9/2006 | Paolini, Jr. et al. |
| 7,116,318 B2 | 10/2006 | Amundson et al. |
| 7,116,466 B2 | 10/2006 | Whitesides et al. |
| 7,119,759 B2 | 10/2006 | Zehner et al. |
| 7,119,772 B2 | 10/2006 | Amundson et al. |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,180,649 B2 | 2/2007 | Morrison et al. |
| 7,190,008 B2 | 3/2007 | Amundson et al. |
| 7,193,625 B2 | 3/2007 | Danner et al. |
| 7,202,847 B2 | 4/2007 | Gates |
| 7,202,991 B2 | 4/2007 | Zhang et al. |
| 7,206,119 B2 | 4/2007 | Honeyman et al. |
| 7,223,672 B2 | 5/2007 | Kazlas et al. |
| 7,230,604 B2 | 6/2007 | Machida et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,236,292 B2 | 6/2007 | LeCain |
| 7,236,790 B2 | 6/2007 | Tsien et al. |
| 7,236,792 B2 | 6/2007 | Uchida et al. |
| 7,242,513 B2 | 7/2007 | Albert et al. |
| 7,247,379 B2 | 7/2007 | Pullen et al. |
| 7,256,766 B2 | 8/2007 | Albert et al. |
| 7,259,744 B2 | 8/2007 | Arango et al. |
| 7,280,094 B2 | 10/2007 | Albert |
| 7,304,634 B2 | 12/2007 | Albert et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,312,916 B2 | 12/2007 | Pullen et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,349,148 B2 | 3/2008 | Doshi et al. |
| 7,352,353 B2 | 4/2008 | Albert et al. |
| 7,365,394 B2 | 4/2008 | Denis et al. |
| 7,365,733 B2 | 4/2008 | Duthaler et al. |
| 7,369,299 B2 | 5/2008 | Sakurai et al. |
| 7,375,875 B2 | 5/2008 | Whitesides et al. |
| 7,382,363 B2 | 6/2008 | Albert et al. |
| 7,388,572 B2 | 6/2008 | Duthaler et al. |
| 7,391,555 B2 | 6/2008 | Albert et al. |
| 7,411,719 B2 | 8/2008 | Paolini, Jr. et al. |
| 7,411,720 B2 | 8/2008 | Honeyman et al. |
| 7,420,549 B2 | 9/2008 | Jacobson et al. |
| 7,432,907 B2 | 10/2008 | Goden |
| 7,442,587 B2 | 10/2008 | Amundson et al. |
| 7,443,571 B2 | 10/2008 | LeCain et al. |
| 7,453,445 B2 | 11/2008 | Amundson |
| 7,477,444 B2 | 1/2009 | Cao et al. |
| 7,492,339 B2 | 2/2009 | Amundson |
| 7,492,497 B2 | 2/2009 | Paolini, Jr. et al. |
| 7,513,813 B2 | 4/2009 | Paolini, Jr. et al. |
| 7,525,719 B2 | 4/2009 | Yakushiji et al. |
| 7,528,822 B2 | 5/2009 | Amundson et al. |
| 7,532,388 B2 | 5/2009 | Whitesides et al. |
| 7,535,624 B2 | 5/2009 | Amundson et al. |
| 7,545,358 B2 | 6/2009 | Gates et al. |
| 7,551,346 B2 | 6/2009 | Fazel et al. |
| 7,554,712 B2 | 6/2009 | Patry et al. |
| 7,561,324 B2 | 7/2009 | Duthaler et al. |
| 7,580,025 B2 | 8/2009 | Nakai et al. |
| 7,583,251 B2 | 9/2009 | Arango et al. |
| 7,583,427 B2 | 9/2009 | Danner et al. |
| 7,598,173 B2 | 10/2009 | Ritenour et al. |
| 7,602,374 B2 | 10/2009 | Zehner et al. |
| 7,605,799 B2 | 10/2009 | Amundson et al. |
| 7,612,760 B2 | 11/2009 | Kawai |
| 7,646,530 B2 | 1/2010 | Takagi et al. |
| 7,649,666 B2 | 1/2010 | Isobe et al. |
| 7,649,674 B2 | 1/2010 | Danner et al. |
| 7,667,684 B2 | 2/2010 | Jacobson et al. |
| 7,667,886 B2 | 2/2010 | Danner et al. |
| 7,672,040 B2 | 3/2010 | Sohn et al. |
| 7,679,599 B2 | 3/2010 | Kawai |
| 7,679,814 B2 | 3/2010 | Paolini, Jr. et al. |
| 7,688,297 B2 | 3/2010 | Zehner et al. |
| 7,688,497 B2 | 3/2010 | Danner et al. |
| 7,705,823 B2 | 4/2010 | Nihei et al. |
| 7,705,824 B2 | 4/2010 | Baucom et al. |
| 7,728,811 B2 | 6/2010 | Albert et al. |
| 7,729,039 B2 | 6/2010 | LeCain et al. |
| 7,733,311 B2 | 6/2010 | Amundson et al. |
| 7,733,335 B2 | 6/2010 | Zehner et al. |
| 7,733,554 B2 | 6/2010 | Danner et al. |
| 7,746,544 B2 | 6/2010 | Comiskey et al. |
| 7,785,988 B2 | 8/2010 | Amundson et al. |
| 7,787,169 B2 | 8/2010 | Abramson et al. |
| 7,791,782 B2 | 9/2010 | Paolini, Jr |
| 7,791,789 B2 | 9/2010 | Albert et al. |
| 7,826,129 B2 | 11/2010 | Wu et al. |
| 7,839,564 B2 | 11/2010 | Whitesides et al. |
| 7,843,621 B2 | 11/2010 | Danner et al. |
| 7,843,624 B2 | 11/2010 | Danner et al. |
| 7,848,006 B2 | 12/2010 | Wilcox et al. |
| 7,848,007 B2 | 12/2010 | Paolini, Jr. et al. |
| 7,859,637 B2 | 12/2010 | Amundson et al. |
| 7,893,435 B2 | 2/2011 | Kazlas et al. |
| 7,903,319 B2 | 3/2011 | Honeyman et al. |
| 7,910,175 B2 | 3/2011 | Webber |
| 7,952,557 B2 | 5/2011 | Amundson et al. |
| 7,952,790 B2 | 5/2011 | Honeyman et al. |

(56) References Cited

U.S. PATENT DOCUMENTS

| | | |
|---|---|---|
| 7,956,841 B2 | 6/2011 | Albert et al. |
| 7,999,787 B2 | 8/2011 | Amundson et al. |
| 8,009,348 B2 | 8/2011 | Zehner et al. |
| 8,018,640 B2 | 9/2011 | Whitesides et al. |
| 8,034,209 B2 | 10/2011 | Danner et al. |
| 8,035,886 B2 | 10/2011 | Jacobson |
| 8,064,962 B2 | 11/2011 | Wilcox et al. |
| 8,068,090 B2 | 11/2011 | Machida et al. |
| 8,077,141 B2 | 12/2011 | Duthaler et al. |
| 8,089,453 B2 | 1/2012 | Comiskey et al. |
| 8,106,853 B2 * | 1/2012 | Moore ............... G02F 1/13334 345/107 |
| 8,115,729 B2 | 2/2012 | Danner et al. |
| 8,125,501 B2 | 2/2012 | Amundson et al. |
| 8,129,655 B2 | 3/2012 | Jacobson et al. |
| 8,139,050 B2 | 3/2012 | Jacobson et al. |
| 8,174,490 B2 | 5/2012 | Whitesides et al. |
| 8,177,942 B2 | 5/2012 | Paolini, Jr. et al. |
| 8,289,250 B2 | 10/2012 | Zehner et al. |
| 8,300,006 B2 | 10/2012 | Zhou et al. |
| 8,305,341 B2 | 11/2012 | Arango et al. |
| 8,314,784 B2 | 11/2012 | Ohkami et al. |
| 8,319,759 B2 | 11/2012 | Jacobson et al. |
| 8,384,658 B2 | 2/2013 | Albert et al. |
| 8,390,301 B2 | 3/2013 | Danner et al. |
| 8,390,918 B2 | 3/2013 | Wilcox et al. |
| 8,466,852 B2 | 6/2013 | Drzaic et al. |
| 8,482,835 B2 | 7/2013 | LeCain et al. |
| 8,537,103 B2 | 9/2013 | Koyama |
| 8,558,783 B2 | 10/2013 | Wilcox et al. |
| 8,610,988 B2 | 12/2013 | Zehner et al. |
| 8,797,255 B2 | 8/2014 | Hsu et al. |
| 8,928,562 B2 | 1/2015 | Gates et al. |
| 9,199,441 B2 | 12/2015 | Danner |
| 9,412,314 B2 | 8/2016 | Amundson et al. |
| 9,672,766 B2 | 6/2017 | Sjodin |
| 2001/0026260 A1 | 10/2001 | Yoneda et al. |
| 2002/0060321 A1 | 5/2002 | Kazlas et al. |
| 2002/0090980 A1 | 7/2002 | Wilcox et al. |
| 2002/0113770 A1 | 8/2002 | Jacobson et al. |
| 2002/0196219 A1 | 12/2002 | Matsunaga et al. |
| 2003/0048522 A1 | 3/2003 | Liang et al. |
| 2003/0058223 A1 | 3/2003 | Tracy et al. |
| 2003/0099027 A1 | 5/2003 | Shigehiro et al. |
| 2003/0102858 A1 | 6/2003 | Jacobson et al. |
| 2004/0011651 A1 | 1/2004 | Becker et al. |
| 2004/0051934 A1 | 3/2004 | Machida et al. |
| 2004/0105036 A1 | 6/2004 | Danner et al. |
| 2004/0119681 A1 | 6/2004 | Albert et al. |
| 2004/0120024 A1 | 6/2004 | Chen et al. |
| 2004/0246562 A1 | 12/2004 | Chung et al. |
| 2005/0012980 A1 | 1/2005 | Wilcox et al. |
| 2005/0018273 A1 | 1/2005 | Honeyman et al. |
| 2005/0122306 A1 | 6/2005 | Nilcox et al. |
| 2005/0122563 A1 | 6/2005 | Honeyman et al. |
| 2005/0156340 A1 | 7/2005 | Valianatos et al. |
| 2005/0162728 A1 * | 7/2005 | Warner ............... B60R 1/088 359/273 |
| 2005/0253777 A1 | 11/2005 | Zehner et al. |
| 2005/0259068 A1 | 11/2005 | Nihei et al. |
| 2006/0087479 A1 | 4/2006 | Sakurai et al. |
| 2006/0087489 A1 | 4/2006 | Sakurai et al. |
| 2006/0176267 A1 | 8/2006 | Honeyman et al. |
| 2006/0209008 A1 | 9/2006 | Nihei et al. |
| 2006/0214906 A1 | 9/2006 | Kobayashi et al. |
| 2006/0231401 A1 | 10/2006 | Sakurai et al. |
| 2007/0052757 A1 | 3/2007 | Jacobson |
| 2007/0085819 A1 | 4/2007 | Zhou et al. |
| 2007/0091417 A1 | 4/2007 | Cao et al. |
| 2007/0091418 A1 | 4/2007 | Danner et al. |
| 2007/0103427 A1 | 5/2007 | Zhou |
| 2007/0285385 A1 | 12/2007 | Albert et al. |
| 2008/0024429 A1 | 1/2008 | Zehner |
| 2008/0024482 A1 | 1/2008 | Gates et al. |
| 2008/0043318 A1 | 2/2008 | Whitesides et al. |
| 2008/0048970 A1 | 2/2008 | Drzaic et al. |
| 2008/0130092 A1 | 6/2008 | Whitesides et al. |
| 2008/0136774 A1 | 6/2008 | Harris et al. |
| 2008/0291129 A1 | 11/2008 | Harris et al. |
| 2009/0009852 A1 | 1/2009 | Honeyman et al. |
| 2009/0122389 A1 | 5/2009 | Whitesides et al. |
| 2009/0168067 A1 | 7/2009 | LeCain et al. |
| 2009/0174651 A1 | 7/2009 | Jacobson et al. |
| 2013/0063333 A1 | 3/2013 | Arango et al. |
| 2015/0339983 A1 | 11/2015 | Danner et al. |
| 2015/0346578 A1 | 12/2015 | Amundson, Jr. et al. |

FOREIGN PATENT DOCUMENTS

| | | |
|---|---|---|
| EP | 0443571 | 8/1991 |
| EP | 0618715 | 10/1994 |
| EP | 0659866 A2 | 6/1995 |
| EP | 0886257 | 12/1998 |
| EP | 1099207 | 5/2001 |
| EP | 1145072 | 10/2001 |
| EP | 1462847 | 9/2004 |
| EP | 1482354 | 12/2004 |
| EP | 1484635 | 12/2004 |
| EP | 1500971 | 1/2005 |
| EP | 1501194 | 1/2005 |
| EP | 1536271 | 6/2005 |
| EP | 1542067 | 6/2005 |
| EP | 1577702 | 9/2005 |
| EP | 1577703 | 9/2005 |
| EP | 1598694 | 11/2005 |
| JP | S5688193 A | 7/1981 |
| JP | 59155832 | 9/1984 |
| JP | S59155832 A | 9/1984 |
| JP | 62058222 | 3/1987 |
| JP | 63008636 | 1/1988 |
| JP | 63192024 | 8/1988 |
| JP | 03213827 | 3/1991 |
| JP | H0353224 A | 3/1991 |
| JP | 03-091722 A | 4/1991 |
| JP | 03-096925 | 4/1991 |
| JP | 05080298 | 4/1993 |
| JP | 05173194 | 7/1993 |
| JP | 06233131 | 8/1994 |
| JP | 07005845 | 1/1995 |
| JP | 09016116 A | 1/1997 |
| JP | 09185087 A | 7/1997 |
| JP | 09230391 A | 9/1997 |
| JP | 11006993 | 1/1999 |
| JP | 11084339 | 3/1999 |
| JP | 11113019 | 4/1999 |
| JP | 2000180887 | 6/2000 |
| JP | 2000221546 | 8/2000 |
| JP | 2000292772 | 10/2000 |
| JP | 2001188267 | 7/2001 |
| JP | 4613424 B2 | 10/2001 |
| JP | 2001350430 | 12/2001 |
| JP | 2001350430 A | 12/2001 |
| JP | 2003330179 A | 11/2003 |
| JP | 2006162732 A | 6/2006 |
| WO | 9910769 | 3/1999 |
| WO | 1999010870 | 3/1999 |
| WO | 1999067678 A2 | 12/1999 |
| WO | 2000005704 A1 | 2/2000 |
| WO | 2000036560 | 6/2000 |
| WO | 2000038000 | 6/2000 |
| WO | 2000067110 | 11/2000 |
| WO | 2000067327 A1 | 11/2000 |
| WO | 2001007961 | 2/2001 |
| WO | 2004079442 | 9/2004 |
| WO | 2004107031 A1 | 12/2004 |
| WO | 2006015044 | 2/2006 |

OTHER PUBLICATIONS

Wood, D., "An Electrochromic Renaissance?" Information Display, 18(3), 24 (Mar. 2002) Mar. 1, 2002.

(56) References Cited

OTHER PUBLICATIONS

O'Regan, B. et al., "A Low Cost, High-efficiency Solar Cell Based on Dye-sensitized colloidal TiO2 Films", Nature, vol. 353, Oct. 24, 1991, 737-740 Oct. 24, 1991.
Bach, U., et al., "Nanomaterials-Based Electrochromics for Paper-Quality Displays", Adv. Mater, 14(11), 845 (2002) Jun. 5, 2002.
Kitamura, T., et al., "Electrical toner movement for electronic paper-like display", Asia Display/IDW '01, p. 1517, Paper HCS1-1 (2001) Jan. 1, 2001.
Yamaguchi, Y., et al., "Toner display using insulative particles charged triboelectrically", Asia Display/IDW '01, p. 1729, Paper AMD4-4 (2001) Jan. 1, 2001.
Kitamura, T., et al., "Electrical toner movement for electronic paper-like display", Asia Display/IDW '01, p. 1517, Paper HCS1-1 (2001) Dec. 31, 2001.
Yamaguchi, Y., et al., "Toner display using insulative particles charged triboelectrically", Asia Display/IDW '01, p. 1729, Paper AMD4-4 (2001) Dec. 31, 2001.
Chen, Y., et al., "A Conformable Electronic Ink Display using a Foil-Based a-Si TFT Array", SID 01 Digest, 157 (Jun. 2001) Jun. 30, 2001.
Comiskey, B., et al., "An electrophoretic ink for all-printed reflective electronic displays", Nature, 394, 253 (1998) Dec. 31, 1998.
Comiskey, B., et al., "Electrophoretic Ink: A Printable Display Material", SID 97 Digest (1997), p. 75 Dec. 31, 1997.
Drzaic, P., et al., "A Printed and Rollable Bistable Electronic Display", SID 98 Digest (1998), p. 1131 Dec. 31, 1998.
Duthaler, G., et al., "Active-Matrix Color Displays Using Electrophoretic Ink and Color Filters", SID 02 Digest, 1374 (2002) Dec. 31, 2002.
Jacobson, J., et al., "The last book", IBM Systems J., 36, 457 (1997) Dec. 31, 1997.
Jo, G-R, et al., "Toner Display Based on Particle Movements", Chem. Mater, 14, 664 (2002) Dec. 31, 2002.
Kazlas, P., et al., "12.1" SVGA Microencapsulated Electrophoretic Active Matrix Display for Information Applicances, SID 01 Digest, 152 (Jun. 2001) Jun. 30, 2001.
Pitt, M.G., et al., "Power Consumption of Microencapsulated Electrophoretic Displays for Smart Handheld Applications", SID 02 Digest, 1378 (2002) Dec. 31, 2002.
Shiffman, R.R., et al., "An Electrophoretic Image Display with Internal NMOS Address Logic and Display Drivers," Proceedings of the SID, 1984, vol. 25, 105 (1984) Dec. 31, 1984.
Singer, B., et al., "An X-Y Addressable Electrophoretic Display," Proceedings of the SID, 18, 255 (1977) Dec. 31, 1977.
Webber, R., "Image Stability in Active-Matrix Microencapsulated Electrophoretic Displays", SID 02 Digest, 126 (2002) Dec. 31, 2002.
Zehner, R. et al., "Drive Waveforms for Active Matrix Electrophoretic Displays", SID 03 Digest, 842 (2003) Dec. 31, 2003.
Amundson, K., et al., "12.3: Flexible, Active-Matrix Display Constructed Using a Microencapsulated Electrophoretic Material and an Organic-Semiconductor-Based Backplane", SID 01 Digest, 160 (Jun. 2001) Jun. 30, 2001.
Au, J. et al., "Ultra-Thin 3.1-in. Active-Matrix Electronic Ink Display for Mobile Devices", IDW'02, 223 (2002) Dec. 31, 2002.
Bouchard, A. et al., "High-Resolution Microencapsulated Electrophoretic Display on Silicon", SID 04 Digest, 651 (2004) Dec. 31, 2004.
Caillot, E. et al. "Active Matrix Electrophoretic Information Display for High Performance Mobile Devices", IDMC Proceedings (2003) Dec. 31, 2003.
Danner, G.M. et al., "Reliability Performance for Microencapsulated Electrophoretic Displays with Simulated Active Matrix Drive", SID 03 Digest, 573 (2003) Dec. 31, 2003.
Henzen, A. et al., "An Electronic Ink Low Latency Drawing Tablet", SID 04 Digest, 1070 (2004) Dec. 31, 2004.
Henzen, A. et al., "Development of Active Matrix Electronic Ink Displays for Handheld Devices", SID 03 Digest, 176, (2003) Dec. 31, 2003.
Henzen, A. et al., "Development of Active Matrix Electronic Ink Displays for Smart Handheld Applications", IDW'02, 227(2002) Dec. 31, 2002.
Kazlas, P. et al., "Card-size Active-matrix Electronic Ink Display", Eurodisplay 2002, 259 (2002) Dec. 31, 2002.
Shiwa, S., et al., "Electrophoretic Display Method Using Ionographic Technology," SID 88 Digest (1988), p. 61 Dec. 31, 1988.
Whitesides, T. et al., "Towards Video-rate Microencapsulated Dual-Particle Electrophoretic Displays", SID 04 Digest, 133 (2004) Dec. 31, 2004.
Amundson, K., "Electrophoretic Imaging Films for Electronic Paper Displays" in Crawford, G. ed. Flexible Flat Panel Displays, John Wiley & Sons, Ltd., Hoboken, NJ (2005) Dec. 31, 2005.
Gates, H. et al. "A5 Sized Electronic Paper Display for Document Viewing", SID 05 Digest (2005) Dec. 31, 2005.
Johnson, M. et al., "High Quality Images on Electronic Paper Displays", SID 05 Digest, 1666 (2005) Dec. 31, 2005.
Dalisa, A.L., "Electrophoretic Display Technology", IEEE Trans. Electron Dev., ED-24, 827 (1977) Jul. 31, 1977.
Gutcho, M.H., Microcapsules and MIcroencapsulation Techniques, Noyes Data Corp., Park Ridge NJ, (1976) Dec. 31, 1976.
United States Patent and Trademark Office; PCT/US2008/051885; International Search Report and Written Opinion; dated Jul. 15, 2008. Jul. 15, 2008.
European Patent Office; EP Application No. 08728187.9; Extended European Search Report; dated Mar. 16, 2011. Mar. 16, 2011.
European Patent Office; EP Application No. 12007387.9; Extended European Search Report; dated Jan. 9, 2013. Jan. 9, 2013.
Kornfeld, A Defect-Tolerant Active-Matrix Electrophoretic Display, SID Digest, 1984, p. 142 Dec. 31, 1984.
Moesner, F.M., et al., "Devices for Particle Handling by an AC Electric Field", IEEE, 1995, p. 66 Dec. 31, 1995.
Bohnke et al., "Polymer-Based Solid Electrochromic Cell for Matrix-Addressable Display Devices." J. Electrochem. Soc., 138, 3612(1991) Dec. 31, 1991.
Hayes, R.A. et al., "Video-Speed Electronic Paper Based on Electrowetting", Nature, vol. 425, No. 25, pp. 383-385 (Sep. 2003). Sep. 25, 2003.
Antia, M., "Switchable Reflections Make Electronic Ink", Science, 285, 658 (1999) Dec. 31, 1999.
Hunt, R.W.G., "Measuring Color", 3d. Edn, Fountain Press (ISBN 0 86343 387 1), p. 63 (1998) Dec. 31, 1998.
Mossman, M.A., et al., "A New Reflective Color Display Technique Based on Total Internal Reflection and Substractive Color Filtering", SID 01 Digest, 1054 (2001) Dec. 31, 2001.
Poor, A., "Feed forward makes LCDs Faster", available at "http://www.extremetech.com/article2/0,3973,10085,00.asp" Sep. 24, 2001.
Vaz, Nuno A. et al., "Dual frequency addressing of polymer-dispersed liquid-crystal films", J. Appl. Phys., vol. 65, pp. 5043-5050 (1989). Jan. 1, 1989.
Cameron, N.R. et al., "High Internal Phase Emulsions (HIPEs)—Structure, Properties and Use in Polymer Preparation". Adv. Polym. Sci., vol. 126, p. 163 (1996). Jan. 1, 1996.
Bampfield, H.A. et al., "Emulsion Explosives", Encyclopedia of Emulsion Technology, vol. 3, pp. 281-306 (1988). Jan. 1, 1988.

* cited by examiner

METHODS FOR DRIVING ELECTROPHORETIC DISPLAYS USING DIELECTROPHORETIC FORCES

REFERENCE TO RELATED APPLICATIONS

This application claims benefit of copending application Ser. No. 11/949,316, filed Dec. 3, 2007.

The aforementioned application Ser. No. 11/949,316 claims benefit of Application Ser. No. 60/887,876, filed Feb. 2, 2007.

This aforementioned application Ser. No. 11/949,316 is also a continuation-in-part of application Ser. No. 11/460,358, filed Jul. 27, 2006 (now U.S. Pat. No. 7,304,787), which is itself a divisional of application Ser. No. 11/161,179, filed Jul. 26, 2005 (now U.S. Pat. No. 7,116,466), which itself claims benefit of Application Ser. No. 60/591,416, filed Jul. 27, 2004.

This aforementioned application Ser. No. 11/949,316 is also a continuation-in-part of application Ser. No. 11/162,188, filed Aug. 31, 2005 (now U.S. Pat. No. 7,999,787), which claims benefit of Application Ser. No. 60/605,761, filed Aug. 31, 2004

This application is also related to:
(a) application Ser. No. 10/907,140, filed Mar. 22, 2005 (now U.S. Pat. No. 7,327,511), which itself claims benefit of provisional Application Ser. No. 60/555,529, filed Mar. 23, 2004, and of provisional Application Ser. No. 60/585,579, filed Jul. 7, 2004;
(b) U.S. Pat. No. 7,259,744; and
(c) U.S. Pat. No. 7,193,625.

The entire contents of these patents and copending applications, and of all other U.S. patents and published and copending applications mentioned below, are herein incorporated by reference.

BACKGROUND OF INVENTION

This invention relates to methods for driving electrophoretic displays using dielectrophoretic forces. More specifically, this invention relates to driving methods for switching particle-based electrophoretic displays between various optical states using electrophoretic and dielectrophoretic forces. The displays of the present invention may either be shutter mode displays (as the term is defined below) or light modulators, that is to say to variable transmission windows, mirrors and similar devices designed to modulate the amount of light or other electro-magnetic radiation passing therethrough; for convenience, the term "light" will normally be used herein, but this term should be understood in a broad sense to include electro-magnetic radiation at non-visible wavelengths. For example, as mentioned below, the present invention may be applied to provide windows which can modulate infra-red radiation for controlling temperatures within buildings. More specifically, this invention relates to electro-optic displays and light modulators which use particle-based electrophoretic media to control light modulation.

The term "gray state" is used herein in its conventional meaning in the imaging art to refer to a state intermediate two extreme optical states of a pixel, and does not necessarily imply a black-white transition between these two extreme states. For example, several of the patents and published applications referred to below describe electrophoretic displays in which the extreme states are white and deep blue, so that an intermediate "gray state" would actually be pale blue. Indeed, the transition between the two extreme states may not be a color change at all, but may be a change in some other optical characteristic of the display, such as optical transmission, reflectance, luminescence or, in the case of displays intended for machine reading, pseudocolor in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Particle-based electrophoretic displays, in which a plurality of charged particles move through a fluid under the influence of an electric field, have been the subject of intense research and development for a number of years. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y, et al., "Toner display using insulative particles charged triboelectrically", IDW Japan, 2001, Paper AMD4-4). See also U.S. Patent Publication No. 2005/0001810; European Patent Applications 1,462,847; 1,482,354; 1,484,635; 1,500,971; 1,501,194; 1,536,271; 1,542,067; 1,577,702; 1,577,703; and 1,598,694; and International Applications WO 2004/090626; WO 2004/079442; and WO 2004/001498. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; 6,870,661; 6,900,851; 6,922,276; 6,950,200; 6,958,848; 6,967,640; 6,982,178; 6,987,603; 6,995,550; 7,002,728; 7,012,600; 7,012,735; 7,023,420; 7,030,412; 7,030,854; 7,034,783; 7,038,655; 7,061,663; 7,071,913; 7,075,502; 7,075,703; 7,079,305; 7,106,296; 7,109,968; 7,110,163; 7,110,164; 7,116,318; 7,116,466; 7,119,759; 7,119,772; 7,148,128; 7,167,155; 7,170,670; 7,173,752; 7,176,880; 7,180,649; 7,190,008; 7,193,625; 7,202,847; 7,202,991; 7,206,119; 7,223,672; 7,230,750; 7,230,751; 7,236,790; and 7,236,792; and U.S. Patent Applications Publication Nos. 2002/0060321; 2002/0090980; 2003/0011560; 2003/0102858; 2003/0151702; 2003/0222315; 2004/0094422; 2004/0105036; 2004/0112750; 2004/0119681; 2004/0136048; 2004/0155857; 2004/0180476; 2004/0190114; 2004/0196215; 2004/0226820; 2004/0257635; 2004/0263947; 2005/0000813; 2005/0007336; 2005/0012980; 2005/0017944; 2005/0018273; 2005/0024353; 2005/0062714; 2005/0067656; 2005/0099672; 2005/0122284; 2005/0122306; 2005/0122563; 2005/0134554; 2005/0151709; 2005/0152018; 2005/0156340; 2005/0179642; 2005/0190137; 2005/0212747; 2005/0213191; 2005/0219184; 2005/0253777; 2005/0280626; 2006/0007527; 2006/0024437; 2006/0038772; 2006/0139308; 2006/0139310; 2006/0139311; 2006/0176267; 2006/0181492; 2006/0181504; 2006/0194619; 2006/0197736; 2006/0197737; 2006/0197738; 2006/0202949; 2006/0223282; 2006/0232531; 2006/0245038; 2006/0256425; 2006/0262060; 2006/0279527; 2006/0291034; 2007/0035532; 2007/0035808; 2007/0052757; 2007/0057908; 2007/0069247; 2007/0085818; 2007/0091417; 2007/0091418; 2007/0097489; 2007/0109219; 2007/0128352; and 2007/0146310; and International Applications Publication Nos. WO 00/38000; WO 00/36560; WO 00/67110; and WO 01/07961; and European Patents Nos. 1,099,207 B1; and 1,145,072 B1.

Known electrophoretic media, both encapsulated and unencapsulated, can be divided into two main types, referred to hereinafter for convenience as "single particle" and "dual particle" respectively. A single particle medium has only a single type of electrophoretic particle suspended in a suspending medium, at least one optical characteristic of which differs from that of the particles. (In referring to a single type of particle, we do not imply that all particles of the type are absolutely identical. For example, provided that all particles of the type possess substantially the same optical characteristic and a charge of the same polarity, considerable variation in parameters such as particle size and electrophoretic mobility can be tolerated without affecting the utility of the medium.) When such a medium is placed between a pair of electrodes, at least one of which is transparent, depending upon the relative potentials of the two electrodes, the medium can display the optical characteristic of the particles (when the particles are adjacent the electrode closer to the observer, hereinafter called the "front" electrode) or the optical characteristic of the suspending medium (when the particles are adjacent the electrode remote from the observer, hereinafter called the "rear" electrode, so that the particles are hidden by the suspending medium).

A dual particle medium has two different types of particles differing in at least one optical characteristic and a suspending fluid which may be uncolored or colored, but which is typically uncolored. The two types of particles differ in electrophoretic mobility; this difference in mobility may be in polarity (this type may hereinafter be referred to as an "opposite charge dual particle" medium) and/or magnitude. When such a dual particle medium is placed between the aforementioned pair of electrodes, depending upon the relative potentials of the two electrodes, the medium can display the optical characteristic of either set of particles, although the exact manner in which this is achieved differs depending upon whether the difference in mobility is in polarity or only in magnitude. For ease of illustration, consider an electrophoretic medium in which one type of particles is black and the other type white. If the two types of particles differ in polarity (if, for example, the black particles are positively charged and the white particles negatively charged), the particles will be attracted to the two different electrodes, so that if, for example, the front electrode is negative relative to the rear electrode, the black particles will be attracted to the front electrode and the white particles to the rear electrode, so that the medium will appear black to the observer. Conversely, if the front electrode is positive relative to the rear electrode, the white particles will be attracted to the front electrode and the black particles to the rear electrode, so that the medium will appear white to the observer.

It should be noted that opposite charge "dual particle" media may contain more than two types of particle. For example, U.S. Pat. No. 6,232,950 illustrates, in FIGS. 6-9C, an opposite charge encapsulated triple particle system having three differently colored types of particles in the same capsule; this patent also describes driving methods which enable the capsule to display the colors of the three types of particles. Even more types of particles may be present; it has been found empirically that up to five different types of particles can usefully be present in such displays. For purposes of the present application, such multi-particle media are regarded as sub-species of dual particle media.

If the two types of particles have charges of the same polarity, but differ in electrophoretic mobility (this type of medium may hereinafter to referred to as a "same polarity dual particle" medium), both types of particles will be attracted to the same electrode, but one type will reach the electrode before the other, so that the type facing the observer differs depending upon the electrode to which the particles are attracted. For example suppose the previous illustration is modified so that both the black and white particles are positively charged, but the black particles have the higher electrophoretic mobility. If now the front electrode is negative relative to the rear electrode, both the black and white particles will be attracted to the front electrode, but the black particles, because of their higher mobility will reach it first, so that a layer of black particles will coat the front electrode and the medium will appear black to the observer. Conversely, if the front electrode is positive relative to the rear electrode, both the black and white particles will be attracted to the rear electrode, but the black particles, because of their higher mobility will reach it first, so that a layer of black particles will coat the rear electrode, leaving a layer of white particles remote from the rear electrode and facing the observer, so that the medium will appear white to the observer: note that this type of dual particle medium requires that the suspending fluid be sufficiently transparent to allow the layer of white particles remote from the rear electrode to be readily visible to the observer. Typically, the suspending fluid in such a display is not colored at all, but some color may be incorporated for the purpose of correcting any undesirable tint in the white particles seen therethrough.

Both single and dual particle electrophoretic displays may be capable of intermediate gray states having optical characteristics intermediate the two extreme optical states already described.

Also, many of the aforementioned patents and applications recognize that the walls surrounding the discrete microcapsules in an encapsulated electrophoretic medium could be replaced by a continuous phase, thus producing a so-called "polymer-dispersed electrophoretic display", in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See US Patent Publication No. 2004/0226820); and other similar techniques.) Thus, the resulting display can be flexible. Further, because the display medium can be printed (using a variety of methods), the display itself can be made inexpensively.

One potentially important application of shutter mode displays is as light modulators, that is to say to variable transmission windows, mirrors and similar devices designed to modulate the amount of light or other electro-magnetic radiation passing therethrough. For example, the present invention may be applied to provide windows which can modulate infra-red radiation for controlling temperatures within buildings.

As discussed in the aforementioned 2005/0213191, one potentially important market for electrophoretic media is windows with variable light transmission. As the energy performance of buildings and vehicles becomes increasingly important, electrophoretic media could be used as coatings on windows to enable the proportion of incident radiation transmitted through the windows to be electronically controlled by varying the optical state of the electrophoretic media. Such electronic control can supersede "mechanical" control of incident radiation by, for example, the use of window blinds. Effective implementation of such electronic "variable-transmissivity" ("VT") technology in buildings is expected to provide (1) reduction of unwanted heating effects during hot weather, thus reducing the amount of energy needed for cooling, the size of air conditioning plants, and peak electricity demand; (2) increased use of natural daylight, thus reducing energy used for lighting and peak electricity demand; and (3) increased occupant comfort by increasing both thermal and visual comfort. Even greater benefits would be expected to accrue in an automobile, where the ratio of glazed surface to enclosed volume is significantly larger than in a typical building. Specifically, effective implementation of VT technology in automobiles is expected to provide not only the aforementioned benefits but also (1) increased motoring safety, (2) reduced glare, (3) enhanced mirror performance (by using an electro-optic coating on the mirror), and (4) increased ability to use heads-up displays. Other potential applications include of VT technology include privacy glass and glare-guards in electronic devices.

This invention seeks to provide improved drive schemes for electrophoretic displays using electrophoretic and dielectrophoretic forces. This invention is particularly, although not exclusively, intended for use in such displays used as light modulators.

Hitherto, relatively little consideration appears to have been given to the exact manner in which the electrophoretic particles move when electrophoretic shutter mode displays, including light modulators, move between their open and closed optical states. As discussed in the aforementioned 2005/0213191, the open state is brought about by field dependent aggregation of the electrophoretic particles; such field dependent aggregation may take the form of dielectrophoretic movement of electrophoretic particles to the lateral walls of a capsule or microcell, or "chaining", i.e., formation of strands of electrophoretic particles within the capsule or microcell, or possibly in other ways. Regardless of the exact type of aggregation achieved, such field dependent aggregation of the electrophoretic particles causes the particles to occupy only a small proportion of the viewable area of each capsule or microcell, as seen looking perpendicular to the viewing surface through which an observer views the medium. Thus, in the transparent state, the major part of the viewable area of each capsule or microcell is free from electrophoretic particles and light can pass freely therethrough. In contrast, in the opaque state, the electrophoretic particles are distributed throughout the whole viewable area of each capsule or microcell (the particles may be uniformly distributed throughout the volume of the suspending fluid or concentrated in a layer adjacent one major surface of the electrophoretic layer), so that no light can pass therethrough.

The aforementioned 2006/0038772 describes various methods for driving dielectrophoretic displays. In particular, this publication describes a method for operating a dielectrophoretic display, the method comprising providing a substrate having walls defining at least one cavity, the cavity having a viewing surface; a fluid contained within the cavity; and a plurality of at least one type of particle within the fluid; and applying to the substrate an electric field effective to cause dielectrophoretic movement of the particles so that the particles occupy only a minor proportion of the viewing surface.

This publication also describes a method for operating a dielectrophoretic display, the method comprising providing a dielectrophoretic medium comprising a fluid and a plurality of at least one type of particle within the fluid; applying to the medium an electric field having a first frequency, thereby causing the particles to undergo electrophoretic motion and producing a first optical state; and applying to the medium an electric field having a second frequency higher than the first frequency, thereby causing the particles to undergo dielectrophoretic motion and producing a second optical state different from the first optical state. This method is referred to as the "varying frequency" method. In such a method, the first frequency may be not greater than about 10 Hz and the second frequency may be at least about 100 Hz. Conveniently, the electric fields have substantially the form of square waves or sine waves, though other waveforms can of course be used. It may be advantageous for the second frequency electric field to have a larger magnitude than the first frequency electric field.

In this varying frequency method, it may be advisable to apply the second frequency electric field in an "interrupted manner" with two or more periods of application of the second frequency electric field separated by one or more periods in which no electric field, or a waveform different from that of the second frequency electric field, is applied. Thus, in one form of the varying frequency method, the application of the second frequency electric field is effected by: applying the second frequency electric field for a first period; thereafter applying zero electric field for a period; and thereafter applying the second frequency electric field for a second period. In another form of the varying frequency method, the application of the second frequency electric field is effected by: applying the second frequency electric field for a first period at a first amplitude; thereafter applying the second frequency electric field for a period at a second amplitude less than the first amplitude; and thereafter applying the second frequency electric field for a second period at the first amplitude. In a third form of the varying frequency method, the application of the second frequency electric field is effected by: applying the second frequency electric field for a first period; thereafter applying for a period an electric field having a frequency less than the second frequency; and thereafter applying the second frequency electric field for a second period.

This publication also describes a method for operating a dielectrophoretic display, the method comprising: providing a dielectrophoretic medium comprising a fluid and a plurality of at least one type of particle within the fluid; applying to the medium an electric field having a high amplitude, low frequency component and a low amplitude, high frequency component, thereby causing the particles to undergo electrophoretic motion and producing a first optical state; and applying to the medium an electric field having a low amplitude, low frequency component and a high amplitude, high frequency component, thereby causing the particles to undergo dielectrophoretic motion and producing a second optical state different from the first optical state. This method is referred to as the "varying amplitude" method. In such a method, low frequency components may have frequencies not greater than about 10 Hz and the high frequency components may have frequencies of at least about 100 Hz. The components may have substantially the form of square waves or sine waves.

Consumers desire variable transmission windows with the broadest possible optical transmission range, since this gives the consumer maximum freedom to vary the light level controlled by the variable transmission windows, or conversely the degree of privacy provided by such windows. Since there is usually little difficulty in providing a sufficiently non-transmissive "closed" state of the window (electrophoretic media can readily be formulated to be essentially opaque in this closed state), maximizing the optical transmission range usually amounts to maximizing "open" state transmission for any desired degree of opacity in the closed state. Factors influencing open state transmission include the materials, display construction and production processes used for form the windows, and the methods used to drive the windows to their open and closed states.

As already mentioned the aforementioned 2006/0038772 describes varying frequency drive methods for dielectrophoretic displays in which the display is driven at a first, low frequency, which causes electrophoretic movement of electrophoretic particles, and a second, higher frequency, which causes dielectrophoretic movement of the electrophoretic particles. Such drive methods can cause the electrophoretic particles to form aggregates adjacent capsule, droplet or microcell walls, and/or the formation of chains of electrophoretic particles within the dielectrophoretic medium. It has been found that driving a display to its open state using a constant high drive frequency tends to produce loosely packed aggregates and consequently a less than optimum open state optical transmission. Use of the various methods described in this copending application can produce more closely packed aggregates and hence a more transmissive open state. However, it has now been found that methods which use abrupt large changes in drive frequency may cause an annoying flicker (i.e., rapid changes in optical transmission) visible to an observer of the display.

The aforementioned U.S. Pat. No. 7,116,466 and Publication No. 2006/0256425 describe an electrophoretic display comprising: an electrophoretic medium having a plurality of charged particles suspended in a suspending fluid, and two electrodes disposed on opposed sides of the electrophoretic medium, at least one of the electrodes being light-transmissive and forming a viewing surface through which an observer can view the display, the display having a closed optical state in which the charged particles are spread over substantially the entire viewing surface so that light cannot pass through the electrophoretic medium, and an open optical state in which the electrophoretic particles form chains extending between the electrodes so that light can pass through the electrophoretic medium, the display further comprising insulating layers disposed between the electrodes and the electrophoretic medium. This patent and publication state that the display may comprising voltage supply means for applying voltages to the two electrodes, the voltage supply means being arranged to supply both a high frequency alternating current voltage effective to drive the display to its open optical state and a low frequency alternating or direct current voltage effective to drive the display to its closed optical state; the voltage supply means may be arranged to supply at least one intermediate frequency alternating current voltage having a frequency intermediate those of the high frequency alternating current voltage and the low frequency alternating or direct current voltage, the intermediate frequency alternating current voltage being effective to drive the display to a gray state intermediate the open and closed optical states of the display.

The present invention provides a modification of the variable frequency drive method, described in the aforementioned 2006/0038772, which reduces or eliminates this flicker. The modified drive method of the present invention can also improve optical transmission in the open state.

The present invention also relates to modifying the conductors used to connect display electrodes to voltage sources in dielectrophoretic displays.

SUMMARY OF INVENTION

Accordingly, in one aspect this invention provides a method for operating a dielectrophoretic display, the method comprising:
  providing a dielectrophoretic medium comprising a fluid and a plurality of at least one type of particle within the fluid;
  applying to the medium an electric field having a first frequency, thereby causing the particles to undergo electrophoretic motion and producing a first optical state;
  applying to the medium an electric field having a second frequency higher than the first frequency, thereby causing the particles to undergo dielectrophoretic motion and
  applying to the medium an electric field having a third frequency higher than the second frequency, thereby causing the particles to undergo dielectrophoretic motion and producing a second optical state different from the first optical state.

This method of the invention may for convenience hereinafter be called the "frequency step method". As already indicated, this frequency step method makes use of a second, intermediate frequency between the first, low frequency (which can be direct current) electric field used to produce electrophoretic motion of the particles and the third, high frequency used to produce dielectrophoretic motion. In other words, the frequency step method involves at least two "frequency steps" when moving from the low frequency (closed) state of the display to the high frequency (open) state. However, more than two frequency steps are desirable.

It has been found that to optimize the driving of dielectrophoretic displays used as variable transmissions windows or similar light modulators, it is necessary to control closely both the operating voltage of the display and the variation of the applied driving frequency against time during switching of the display. Since VT windows are typically large area displays, and the VT media used are relatively thin, with the electrodes on each side of the media being (say) 100 µm apart, there is a significant capacitance between the electrodes, and considerable power can be dissipated charging and discharging this capacitance, especially during high frequency operation. Since the power dissipation is proportional to the square of the operating voltage, it is desirable to keep the operating voltage as low as possible consistent with good open and closed states. It has been found that in practice as the operating voltage is increased, the open and closed states improve steadily up to a certain voltage, after which further increases in voltage do not produce any further significant improvement in the open and closed states. It is thus possible to define an optimal drive voltage, which is the minimum drive voltage required to achieve open and closed states differing by not more than 1 percent from the maximum and minimum open and closed state transmissions capable of being achieved by a higher drive voltage. In practice, the optimal drive voltage is usually found to be about 100-150 Volts. For example, in one series of experiments, a VT display was found to given a closed state transmission of 10 percent at 60 Volts and a low frequency and an open state transmission of 60 percent at the same voltage and high frequency. At 100 Volts the corresponding transmissions were 8 and 62 percent respectively, at 120 Volts 5 and 65 percent respectively, and at 200 Volts 4 and 66 percent respectively. (Essentially no further change in open and closed states was observed above 200 Volts.) In this display, the optimal drive voltage is 120 Volts.

It should be noted that transitions between the open and closed states of a VT display are often highly asymmetric, such that closing of the display can be effected using a substantially lower voltage than opening the same display. In these circumstances it is possible to define two different optimal drive voltages, one for opening and one for closing, and indeed a VT display may conveniently be operated using different drive voltages for opening and closing, with significant energy savings but at some additional cost in the drive circuitry. Hereinafter, in such circumstances, "optimal drive voltage" refers to the higher of the opening and closing optimal drive voltages.

It has also been found that, for any given drive voltage, it is possible to define an optimal closed state frequency where the minimum optical transmission is produced without objectionable flicker. Hereinafter, "optimal closed state frequency" refers to the optimal closed state frequency measured at the optimal drive voltage, as defined above. Typically the optimal closed state frequency is between 15 and 100 Hz, and most often between 20 and 40 Hz.

Similarly, it is possible to define an optimal open state frequency as the minimum frequency which, when applied at the optimal drive voltage, as defined above, produces an optical transmission within 1 percent of the maximum optical transmission which can be achieved at higher frequency and the same optimal drive voltage. Keeping the optimal open state frequency as low as possible is, of course, desirable to minimize energy consumption during operation, for the reasons noted above.

It has been found that, in the frequency step method of the present invention, there is a particular frequency range within which the variation of frequency with time should be carefully controlled to secure an optimal open state. The open state achieved is typically insensitive to the variation of frequency with time within a range of from the optimal closed state frequency to twice this frequency, and within a range of from one-half the optimal open state frequency to the open state frequency itself. However, within a transition range, which can be defined empirically as from twice the optimal closed state frequency to one-half of the optimal open state frequency, the open state obtained in dependent upon the variation of frequency with time. Within this transition range, frequency steps should desirably be kept small, less than about 10 percent, preferably less than about 5 percent, and most desirably less than about 1 percent, of the total frequency difference between the optimal closed and open state frequencies used. In fact, it has been found desirable to keep the individual frequency steps so small (for example, about 1 Hz) that within the transition range the variation of frequency with time is essentially continuous. The various frequencies used may be in either an arithmetic or geometric series.

Outside the transition range, the frequency steps can be relatively large without substantially affecting the open state produced. For example, in some cases, jumping from the optimal closed state frequency to twice this frequency (the beginning of the transition range) in a single step and jumping from one-half the optimal open state frequency (the end of the transition range) to the optimal open state frequency in a single step does not adversely affect the open state produced.

As already mentioned, the transitions between the open and closed states of a dielectrophoretic display are asymmetric, and the effect of frequency stepping differs depending upon the direction of the transition; the transmission of the open state is typically highly sensitive to the frequency steps used during the closed-to-open transition, whereas the quality of the closed state is relatively insensitive to the frequency steps used during the open-to-closed transition. This is explicable (although the invention is in no way limited by this explanation) in terms of the inventors' present understanding of the nature of the closed and open states, as set out in the applications referred to in the "Reference to Related Applications" section above. The closed state of a dielectrophoretic display requires only that the electrophoretic particles be substantially uniformly dispersed in the fluid which surrounds them, and the necessary dispersion is effected by electrophoretic forces, which predominate at the low frequencies used to produce the closed state. Closing the display simply requires that whatever aggregates are present in the open state be broken up so that the particles become uniformly dispersed in the closed state, and such breaking up of aggregates would not be expected to be sensitive to the voltage against time curve used, provided substantially uniform particle dispersion is achieved.

However, opening of the display is different. Essentially, opening of the display requires that the particles be moved from a uniform dispersion to a number of separate aggregates, and to provide a good open state the aggregates should occupy as small a proportion as possible of the display area. In practice, this means that it is desirable to form a few large aggregates, and, in the case of microcavity displays (a term which is used herein to mean displays in the which the particles and the surrounding fluid are confined within a plurality of discrete cavities within a continuous phase; the term thus covers capsule-based, microcell and polymer-dispersed displays) that the particles should as far as possible be moved to the sidewalls of the cavities rather than forming aggregates spaced from the walls. Forming such large aggregates depends upon particle-particle interactions, as well as the interactions of individual particles with the electric field, and it is thus not surprising that the quality of the open state may be affected by frequency against time curve used in opening the display.

In view of the asymmetry between the opening and closing of the display, in the frequency step method of the present invention it is not necessary that the same frequency against time curve be used for the two transitions. Indeed, at least in some cases it may not be necessary to use the frequency step method when closing the display, since shifting directly from the open optimal frequency to the closed optimal frequency may give satisfactory results.

In the frequency step method of the present invention, the period for which each intermediate frequency is applied may vary widely. In cases where a large number of intermediate frequencies are used, each intermediate frequency may be applied for a very brief time, say about 0.05 seconds, to simulate a continuous frequency change. In other cases, it may be useful to maintain a specific frequency for a longer period. For example, if the driving circuitry used does not permit fine variation of frequency, so that only a limited number of intermediate frequencies are available, it may be desirable to step rapidly through intermediate frequencies outside the transition range in (say) 0.05 second intervals, while maintaining intermediate frequencies within the transition range for longer periods of (say) 0.5 or 1 seconds.

In the frequency step method of the present invention, the first, second and third frequency electric fields may all be applied at substantially the same amplitude, or higher frequency fields may be applied at larger amplitudes than lower frequency fields, so that, for example, the third frequency field may be applied at a larger amplitude than the first frequency field.

This invention also provides a dielectrophoretic display comprising:
  a dielectrophoretic medium comprising a fluid and a plurality of at least one type of particle within the fluid;
  at least one electrode arranged to apply an electric field to the dielectrophoretic medium; and
  field control means for controlling the electric field applied by the at least one electrode, the field control means being arranged to apply an electric field having a first frequency, which causes the particles to undergo electrophoretic motion and producing a first optical state; an electric field having a second frequency higher than the first frequency, which causes the particles to undergo dielectrophoretic motion and an electric field having a third frequency higher than the second frequency, which causes the particles to undergo dielectrophoretic motion and producing a second optical state different from the first optical state.

This invention extends to a variable transmission window, light modulator, electronic book reader, portable computer, tablet computer, cellular telephone, smart card, sign, watch, shelf label or flash drive comprising a display of the present invention.

This invention also provides a dielectrophoretic display comprising:
  a dielectrophoretic medium comprising a fluid and a plurality of at least one type of particle within the fluid, the particles being movable through the fluid on application of an electric field to the dielectrophoretic medium;

at least one light-transmissive electrode disposed adjacent the dielectrophoretic medium so that the dielectrophoretic medium can be viewed through the light-transmissive electrode; and a conductor extending from the light-transmissive electrode to a voltage source, the conductor having a higher electrical conductivity than the light-transmissive electrode, the conductor contacting the light-transmissive electrode at at least two spaced points.

This type of display may hereinafter for convenience be called a "multi-point contact" display of the invention. In one form of such a dielectrophoretic display, the dielectrophoretic medium and the light-transmissive electrode are rectangular and the conductor is arranged to contact the light-transmissive electrode substantially at the mid-point of each edge of the electrode. The dielectrophoretic of the present invention is especially useful when the dielectrophoretic medium and the light-transmissive electrode are sufficiently large that, if the conductor was connected to the light-transmissive electrode at only a single point, there would be at least one point on the dielectrophoretic medium which was at least about 200 mm from this single connection point.

The conductor may have the form of a conductive trace which extends around substantially the entire periphery of the light-transmissive electrode. For reasons explained below, the conductivity of the conductor is important and in many cases the conductor should have a resistivity not greater than about 1 ohms/square. The light-transmissive electrode may comprise indium tin oxide. The dielectrophoretic display may have the form of a variable transmission window having light-transmissive electrodes on both sides of the dielectrophoretic medium. Use of the dielectrophoretic display of the present invention is not, however, confined to variable transmission windows; the dielectrophoretic displays can be used in any application in which dielectrophoretic and electrophoretic displays have previously been used. Thus, for example, this invention also provides an electronic book reader, portable computer, tablet computer, cellular telephone, smart card, sign, watch, shelf label or flash drive comprising a display of the present invention.

DETAILED DESCRIPTION

Figure 1:
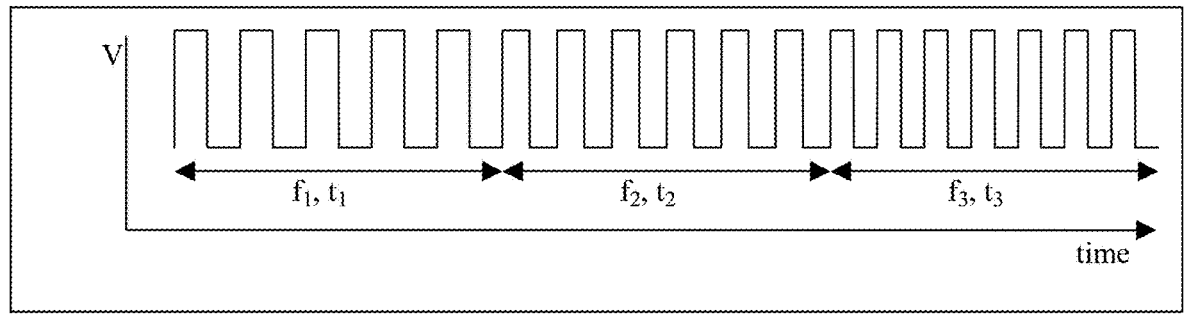
FIG. 1 of the accompanying drawings is a schematic voltage against time curve for a frequency step method of the present invention.

As indicated above, the present invention provides a frequency step method for driving dielectrophoretic displays (and a corresponding display using this method) and a multi-point contact display. These two aspects of the present invention will primarily be described separately below, but it should be appreciated that a single physical display may make use of both aspects of the invention. Indeed, for reasons explained below, it is advantageous for displays using the frequency step method of driving to also use a multi-point contact architecture.

The frequency step method of the present invention is a method for operating a dielectrophoretic display which is a variation of the varying frequency drive method of the aforementioned 2006/0038772. In the method of the present invention, the display is driven using not only a low frequency which causes the particles to undergo electrophoretic motion and produce a first optical state, and a high frequency which causes the particles to undergo dielectrophoretic motion and produce a second optical state different from the first optical state, but also at least one intermediate frequency. Thus, the increase in frequency, needed to bring about a change from electrophoretic to dielectrophoretic movement of the particles, is effected in a series of steps rather than in a single jump as in the prior art method.

Although the frequency step method can be practiced using only two frequency steps (i.e., with a single intermediate frequency), it is desirable that substantially more frequency steps be used, since (the present inventors have found) the smaller the frequency steps the less likely is flicker to be perceived by an observer. In theory, it might be desirable to carry out the transition from low frequency closed state of the display to a high frequency open state by varying the frequency of the electric field continuously, with no discrete frequency steps. However, such continuous frequency variation is typically not practicable with the types of drive circuits normally used to drive electro-optic displays. Accordingly, in practice the frequency step method will normally be practiced using discrete frequencies applied in succession, but it is still desirable that the individual frequency steps be kept small, so that in effect the dielectrophoretic medium undergoes a gradual increase in drive frequency.

As discussed above, the period for which each frequency is applied is also significant although the optimum period for application of each frequency will vary with the characteristics of the drive circuitry and the specific dielectrophoretic medium used. It is desired to give an observer an impression of a smooth continuous change in optical transmission rather than a series of discrete steps. The amplitude (i.e., the voltage applied across the display) may or may not be held constant as the frequency is changed, but use of a constant amplitude is typically preferred since it allows the use of simpler drive circuitry. On the other hand, since the low frequency steps often perform well at lower voltages, use of lower voltages in the low frequency steps will reduce the overall power consumption of the display.

FIG. 1 of the accompanying drawings shows schematically a voltage against time curve for one frequency step method of the present invention. As shown in FIG. 1, the display is driven, using a square wave alternating voltage, at frequency $f_1$ for a time $t_1$, then at a higher frequency $f_2$ for a time $t_2$, and thereafter at a still higher frequency $f_3$ for a time $t_3$.

The Table below shows a more typical waveform for driving a dielectrophoretic display from its closed to its open state.

TABLE

| Frequency (Hz) | Duration (seconds) |
|---|---|
| 100 | 0.2 |
| 125 | 0.2 |
| 150 | 0.2 |
| 175 | 0.2 |
| 200 | 0.2 |
| 225 | 0.2 |
| 250 | 0.2 |
| 275 | 0.2 |
| 300 | 0.2 |
| 325 | 0.2 |
| 350 | 0.2 |
| 375 | 0.2 |
| 400 | 0.2 |
| 425 | 0.2 |
| 450 | 0.2 |
| 475 | 0.2 |
| 500 | 0.2 |

From this Table, it will be seen that this preferred waveform steps from 100 Hz to 500 Hz in 16 separate steps of 25 Hz each, with a period of 0.2 seconds between each step. It has been found that such a gradual increase in drive frequency results in improved (increased) transmission in the open state of the display. Based upon microscopic observation, it is believed (although the invention is in no way limited by this belief) that this improved transmission is due to improved pigment packing at the wall of the capsule or droplet. The use of a large number of smaller frequency steps in this manner also provides a fast and smooth transition from the closed to the open state of the display; an observer does not see the individual small steps, whereas when only a single large step is used, or a small number of large steps, the observer may see an undesirable flicker during the transition.

Figure 2:
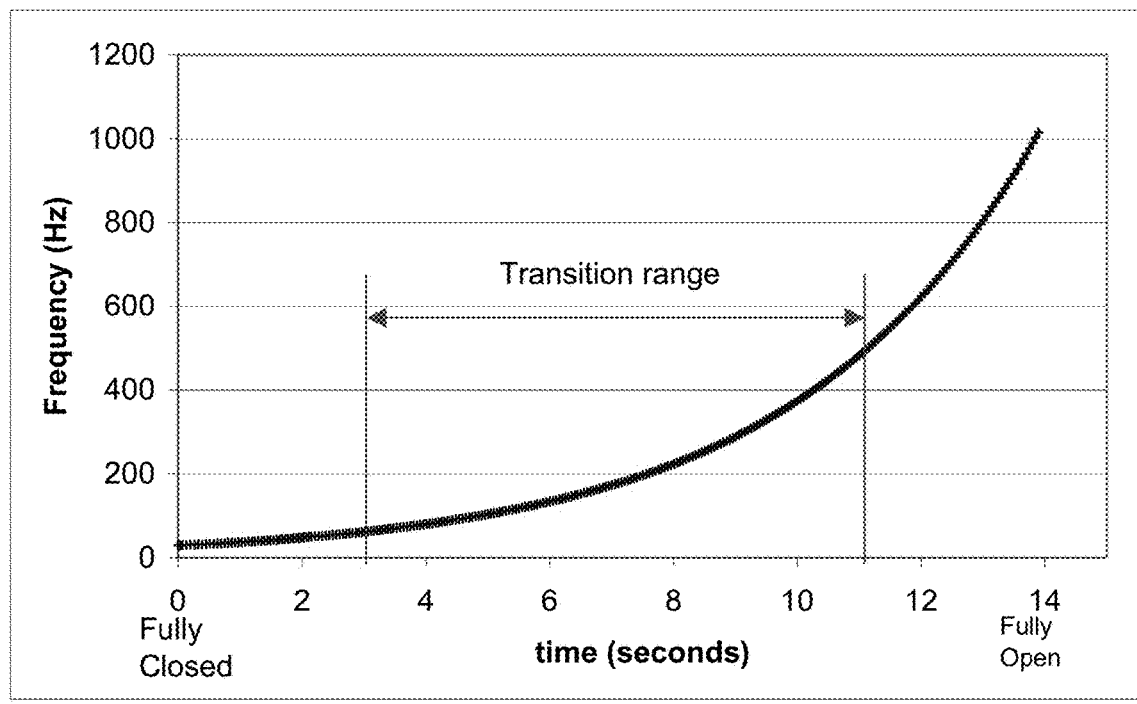
FIGS. 2 and 3 show two different frequency against time curves for two frequency step methods of the present invention different from the method of FIG. 1.
Figure 3:
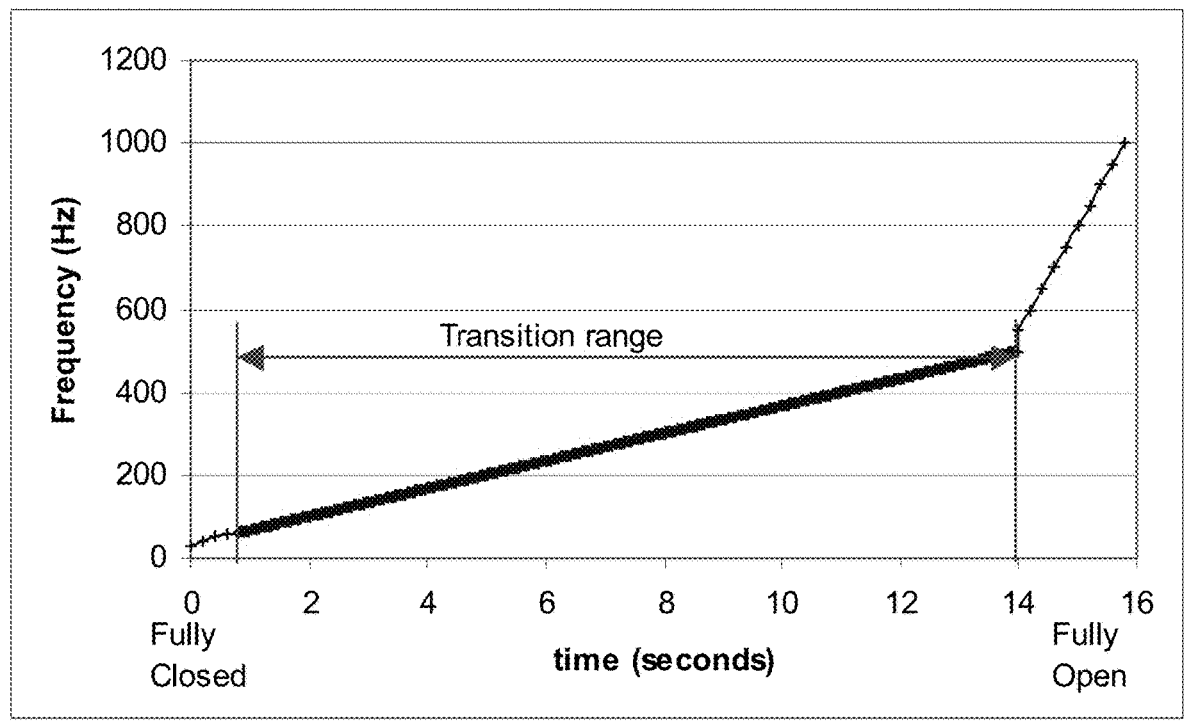

FIGS. 2 and 3 illustrate frequency against time curves for two different frequency step methods of the present invention, both of which operate at constant voltage. In FIGS. 2 and 3, the dielectrophoretic medium is assumed to have an optimal closed frequency of 30 Hz and an optimal open frequency of 1000 Hz, these being typical of those obtained in practice. Thus, in each case the transition range is 60-500 Hz. In the method of FIG. 2, 277 different frequencies are each applied for 0.05 seconds, with the frequency increasing exponentially with time. It will be seen that the display spends approximately 8 seconds out of the total 14 second of the opening transition within the transition range, and it has been found that this dwell time within the transition range is sufficient to provide a good open state.

FIG. 3 illustrate a frequency against time curve which may be easier to implement with simple circuitry than the exponential frequency curve of FIG. 2. In FIG. 3, the frequency is rapidly increased from the optimal closed frequency of 30 Hz to the 60 Hz lower end of the transition range in three steps, with each frequency being applied for 0.2 seconds. Within the transition region, the frequency is linearly increased in a number of very small frequency steps, conveniently 1 Hz, with each frequency being applied for a minimal period of 0.03 seconds. Once the frequency reaches the 500 Hz upper limit of the transition region, the frequency is then raised in 50 Hz steps, with each frequency being applied for 0.2 seconds. This frequency against time curve permits the display to spend more than 13 seconds of the 16 second total transition time within the transition range, and produces an open state which is very close to optimal.

The frequency step method of the present invention, and displays using this method, can include any of the optional features of the drive methods described in the aforementioned U.S. Pat. No. 7,116,466 and 2006/0038772. Thus, for example, the frequency step method may include periods of zero voltage and changes in the amplitude of the drive voltage. A display may be provided with insulating layers disposed between the electrodes and the dielectrophoretic medium. Such an insulating layer may have a volume resistivity of about $10^9$ to about $10^{11}$ ohm cm. In some cases, the insulating layer remote from the viewing surface may be formed by an adhesive layer. The fluid surrounding the particles may have dissolved or dispersed therein a polymer having an intrinsic viscosity of $f_1$ in the suspending fluid and being substantially free from ionic or ionizable groups in the suspending fluid, the polymer being present in the suspending fluid in a concentration of from about $0.5\eta^{-1}$ to about $2.0\eta^{-1}$. The polymer may be polyisobutylene. The display may comprise a color array adjacent the display so as to be visible to the observer, such that the color of the display perceived by the observer can be varied by changing the open and closed optical states of the various pixels of the display.

The frequency step method of the present invention can produce a smooth and fast transition to a fully open, highly transmissive state, and may also be used to drive the display to mid-gray levels, i.e., to optical states intermediate the fully open and fully closed states.

A second aspect of the present invention relates to the manner in which the light-transmissive electrode through which an electrophoretic or dielectrophoretic display is viewed is connected to a voltage source. As discussed in several of the aforementioned E Ink and MIT patents and applications, electrophoretic media typically have high volume resistivities of about $10^{10}$ ohm cm, so that when a DC field is applied across the medium, the current draw is very low and results only from electrical leakage through the medium. However, when an AC field is applied the electrophoretic medium acts as a capacitor, which is charged and discharged in each alternating current half-cycle. In other words, the impedance of the electrophoretic medium is inversely proportional to the drive frequency, and the current flowing during high frequency operation is much larger than that flowing during DC driving.

The materials normally used to form light-transmissive electrodes (which are typically single electrodes extending across the entire display) in electrophoretic and dielectrophoretic displays are of moderate conductivity; for example, indium tin oxide (ITO) has a conductivity of about 300 ohms/square. Accordingly, when a large display (for example, 11 by 14 inches or 279 by 355 mm) is being driven at high frequency, a substantial voltage drop can occur within the light-transmissive electrode between a point at which a conductor used to connect the light-transmissive electrode to a voltage source contacts the light-transmissive electrode, and a point on the light-transmissive electrode remote from this conductor. (The conductor, which does not need to be light transmissive and is typically a metal trace, will normally have a conductivity much greater than that of the light-transmissive electrode.)

Figure 4:
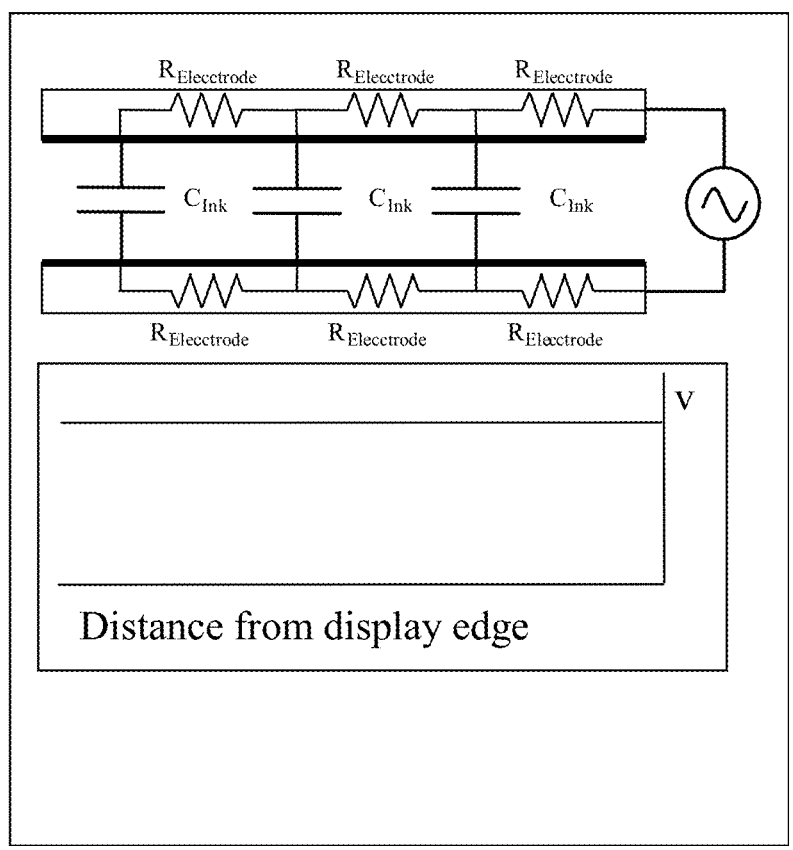
FIG. 4 illustrates an equivalent circuit and a voltage against position curve during low frequency driving of a prior art display.
Figure 5:
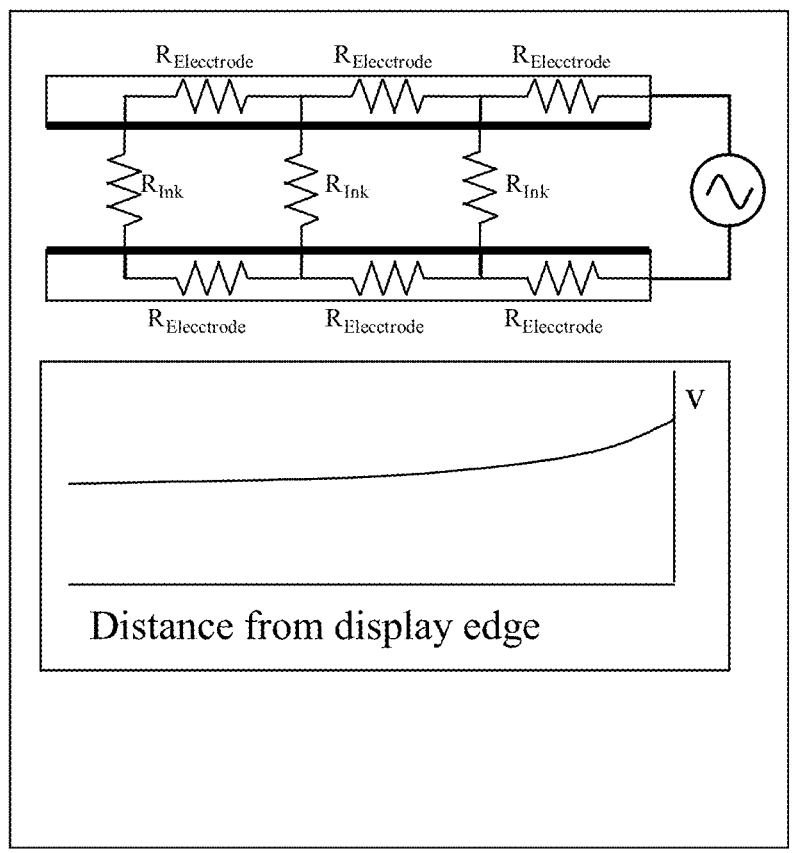
FIG. 5 illustrates an equivalent circuit and a voltage against position curve similar to those of FIG. 4 but showing the situation during high frequency driving of the same prior art display as in FIG. 4.

The different situations during DC and high frequency AC driving of such a display are illustrated in FIGS. 4 and 5 of the accompanying drawings. FIG. 4 illustrates the situation during DC (or very low frequency AC) driving. The electrophoretic medium in effect acts as a series of capacitors (strictly speaking, as a series of capacitors in parallel with very high resistance resistors, but this makes essentially no difference for present purposes), and there is essentially no voltage drop within the light-transmissive layer. In contrast, FIG. 5 illustrates the situation during high frequency AC driving. The electrophoretic medium acts as a series of resistors in series with the inherent resistance of the light-transmissive electrode, and a substantial voltage drop takes place within the light-transmissive electrode, so that the voltage on the electrode varies depending upon the distance from the conductor.

Variations in electrode voltage within the light-transmissive electrode are undesirable because they produce differing electric fields in different parts of the same display which are intended to be subject to the same electrical field, and thus causing different parts of the display to switch at different rates. For example, if a display were to be rewritten from (say) black text on a white background to solid black, variations in electrode voltage within the light-transmissive electrode could cause a visible "wave" whereby portions of the white background closest to the conductor would switch first and portions further from the conductor would switch later. Such a wave artifact is normally objectionable to the user of the display.

One way to reduce such visible artifacts would be to provide a more conductive light-transmissive electrode. However, in the present state of technology, such higher conductivity comes at the expense of optical transmission of the electrode. Also, many materials used to form light-transmissive electrodes, for example ITO, are colored, and increasing the conductivity of the light-transmissive electrode by increasing its thickness may result in an undesirable coloring of a display.

In accordance with the present invention, the conductor is connected to the light-transmissive electrode at a plurality of spaced points. For example, in a rectangular display, the conductor could be arranged to contact the light-transmissive electrode at the mid-point of each edge of the electrode. The invention may be especially useful in displays sufficiently large that at least one point on the display is 200 mm or more from a single conductor connection point. In practice, most variable transmission windows used in buildings will be at least this large. In a preferred form of the invention, the conductor has the form of a conductive trace which extends around the entire periphery, or substantially the entire periphery, of the light-transmissive electrode. This places the conductor as close as possible to all points within the active area of the display, thus minimizing switching non-uniformity during high frequency driving without sacrificing light transmission or producing undesirable color. Such a conductive trace should have as high a conductivity as possible; for example, screen printed silver paint, with a conductivity of about 0.02 ohms/square, has been found to produce uniform switching on displays up to 11 by 14 inches (279 by 355 mm), whereas screen printed carbon paint, with a conductivity of about 15 ohms/square, has been unsatisfactory on such large displays.

Figure 6:
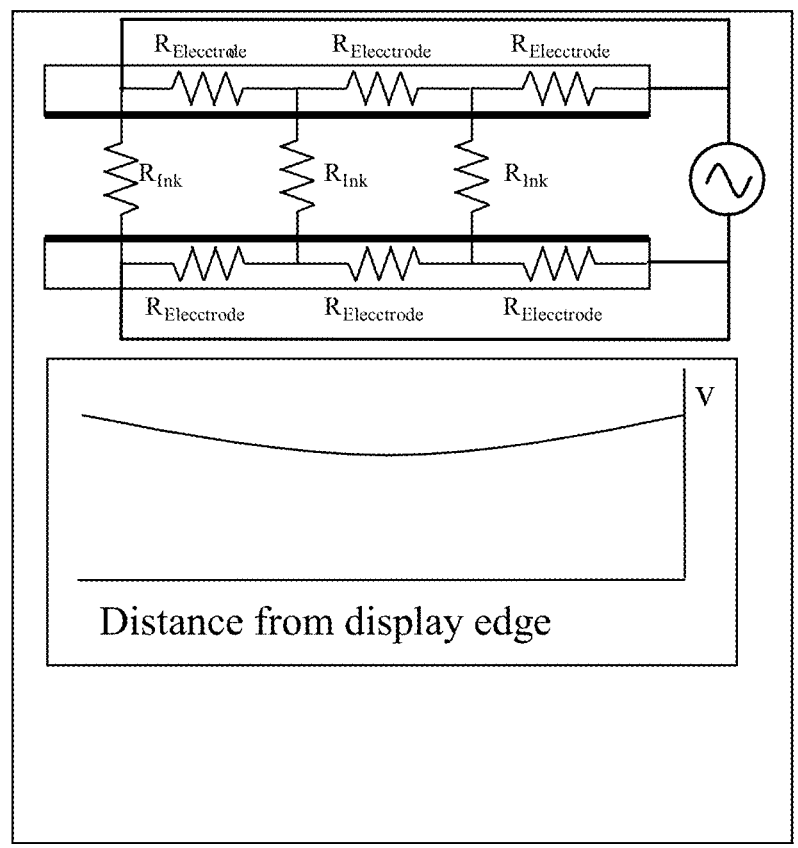
FIG. 6 illustrates an equivalent circuit and a voltage against position curve similar to those of FIG. 5 but showing the situation during high frequency driving of a multi-point contact display of the present invention.

The effect of providing a conductive trace around the periphery of the display is illustrated in FIG. 6 of the accompanying drawings. Since the entire periphery of the light-transmissive electrode is in contact with the conductive trace, the entire periphery is held at the voltage V of the trace. Comparing FIGS. 5 and 6, it will be seen that the maximum difference between the voltages present at spaced points on the light-transmissive electrode is much less in the display of the present invention shown in FIG. 6 than in the prior art display shown in FIG. 5.

The present invention not only provides more uniform switching in large displays but also improves the reliability and durability of the displays due to reduced resistive heating within the light-transmissive electrode. It will be appreciated that variable transmission windows have two light-transmissive electrodes on opposed sides of the electrophoretic medium, and in such windows it will normally be desirable to apply the present invention to both light-transmissive electrodes, although we do not absolutely exclude the possibility that the invention might be applied to only one of two light-transmissive electrodes. The utility of the present invention is not, however, confined to variable transmission windows; the invention can be applied to displays having one light-transmissive electrode and one or more opaque electrodes, such as the displays used in electronic book readers and similar devices, to improve switching uniformity in such displays when it is necessary or desirable to use drive schemes which require high frequency driving.

Numerous changes and modifications can be made in the preferred embodiments of the present invention already described without departing from the scope of the invention. Accordingly, the foregoing description is to be construed in an illustrative and not in a limitative sense.

The invention claimed is:

1. A dielectrophoretic display comprising:
   a dielectrophoretic medium comprising a fluid and a plurality of at least one type of particle within the fluid, the particles being movable through the fluid on application of an electric field to the dielectrophoretic medium;
   at least one light-transmissive electrode disposed adjacent the dielectrophoretic medium so that the dielectrophoretic medium can be viewed through the light-transmissive electrode; and
   a conductor extending from the light-transmissive electrode to a voltage source, the conductor having a higher electrical conductivity than the light-transmissive electrode, the conductor contacting the light-transmissive electrode at at least two spaced points.

2. A dielectrophoretic display according to claim 1 wherein the dielectrophoretic medium and the light-transmissive electrode are rectangular and the conductor is arranged to contact the light-transmissive electrode substantially at the mid-point of each edge of the electrode.

3. A dielectrophoretic display according to claim 1 wherein the dielectrophoretic medium and the light-transmissive electrode are sufficiently large that, if the conductor was connected to the light-transmissive electrode at only a single point, there would be at least one point on the dielectrophoretic medium which was at least about 200 mm from said single point.

4. A dielectrophoretic display according to claim 1 wherein the conductor has the form of a conductive trace which extends around substantially the entire periphery of the light-transmissive electrode.

5. A dielectrophoretic display according to claim 1 wherein the conductor has a resistivity not greater than about 1 ohms/square.

6. A dielectrophoretic display according to claim 1 wherein the light-transmissive electrode comprises indium tin oxide.

7. A dielectrophoretic display according to claim 1 in the form of a variable transmission window having light-transmissive electrodes on both sides of the dielectrophoretic medium.

8. A light modulator, electronic book reader, portable computer, tablet computer, cellular telephone, smart card, sign, watch, shelf label or flash drive comprising a display according to claim 1.

* * * * *